United States Patent

Nakaya et al.

Patent Number: 5,423,209
Date of Patent: Jun. 13, 1995

[54] TRUNCATED PYRAMID-SHAPE MULTI-HOLE PITOT PROBE AND FLIGHT VELOCITY DETECTION SYSTEM USING SAID TRUNCATED PYRAMID-SHAPE MULTI-HOLE PITOT PROBE

[75] Inventors: Teruomi Nakaya; Masao Ebihara, both of Machida; Yoshio Hayashi, Chofu; Seizo Suzuki, Mitaka; Naoaki Kuwano, Chofu; Asao Hanzawa, Hachioji; Takashi Saitow, Komae; Mitsuo Usami, Komae; Toru Iwata, Komae, all of Japan

[73] Assignees: National Aerospace Laboratory of Science and Technology Agency; Tokyo Aircraft Instrument Co., Ltd., both of Tokyo, Japan

[21] Appl. No.: 249,068

[22] Filed: May 25, 1994

Related U.S. Application Data

[63] Continuation of Ser. No. 44,065, Apr. 6, 1993, abandoned.

Foreign Application Priority Data

Apr. 6, 1992 [JP]  Japan .................. 4-112434

[51] Int. Cl.6 .................. G01C 21/00; G01F 1/46
[52] U.S. Cl. .................. 73/182; 73/861.66
[58] Field of Search ............ 73/180, 181, 182, 861.65, 73/861.66, 861.67, 107.14

[56] References Cited

U.S. PATENT DOCUMENTS

| | | | |
|---|---|---|---|
| 2,492,371 | 12/1949 | Sivian | 73/170.14 |
| 3,310,257 | 3/1967 | Price | 73/182 |
| 3,318,146 | 5/1967 | De Leo et al. | 73/180 |
| 4,836,019 | 6/1989 | Hagen et al. | 73/861.65 |
| 5,099,686 | 3/1992 | Köhler | 73/182 |

FOREIGN PATENT DOCUMENTS 63-4666  1/1988  Japan .

Primary Examiner—Richard E. Chilcot, Jr.
Assistant Examiner—William L. Oen
Attorney, Agent, or Firm—Armstrong, Westerman, Hattori, McLeland & Naughton

[57] ABSTRACT

A flight velocity detection system using a truncated pyramid-shape multi-hole Pitot probe in which an extreme end portion has a truncated pyramid-shape, a cylindrical hole is provided at the apex thereof, a total pressure tube of a smaller diameter than that of the cylindrical hole is secured at a position by a predetermined length determined by a relationship with the diameter of the cylindrical hole from the extreme end of the cylindrical hole, and groups of pressure holes comprised of a plurality of pressure holes are arranged in each of the truncated pyramid surfaces of the truncated pyramid shape. Items of pressure information detected by the probe are input into a velocity vector processor to convert them into electric signals, and signals are processed using pressure coefficients of the holes of the probe with respect to the velocity vector stored in advance in the velocity vector processor to calculate flight velocity vector (V, $\alpha$, $\beta$) with respect to the probe axis from the pressure information and air density.

11 Claims, 7 Drawing Sheets

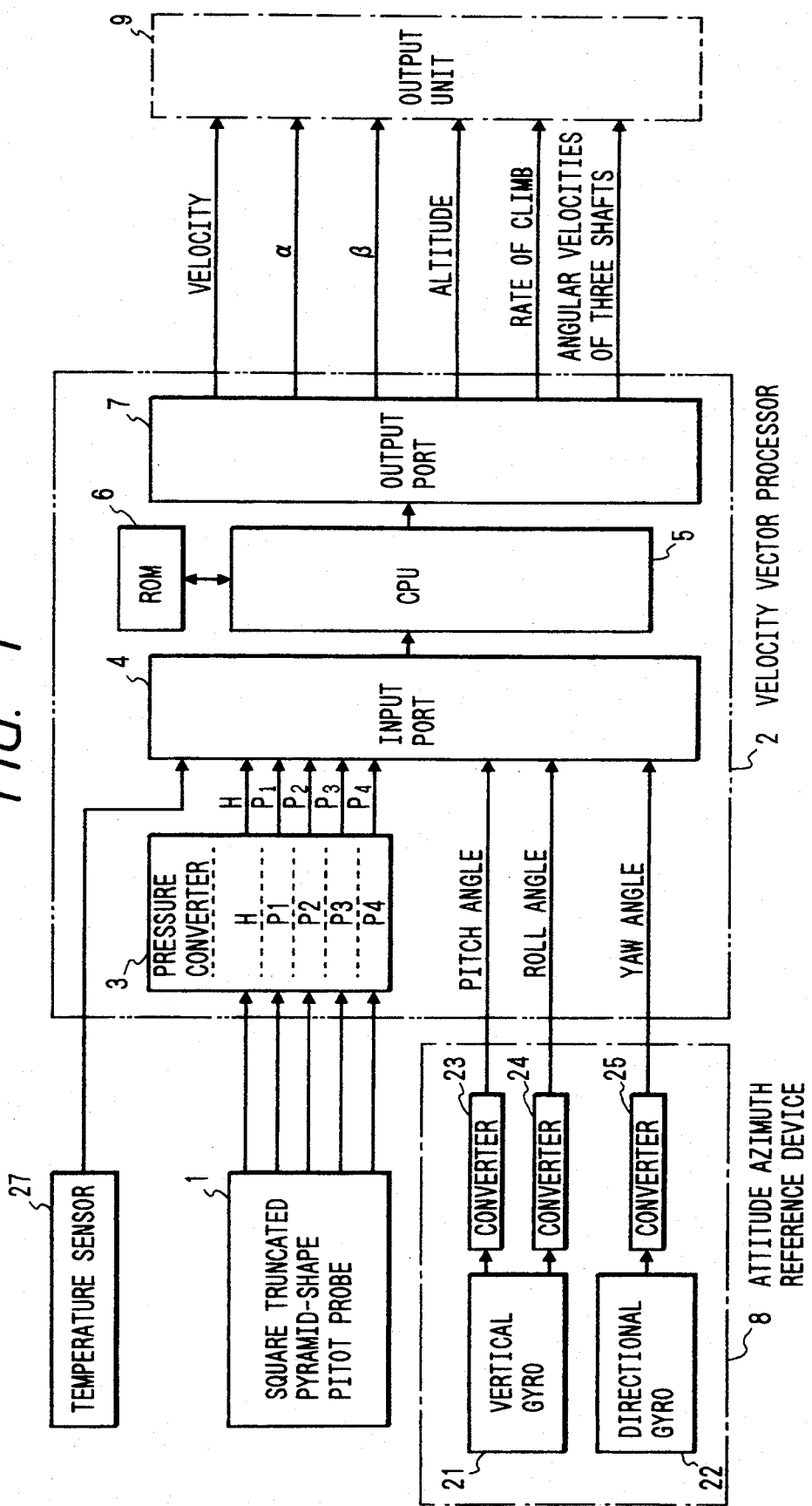

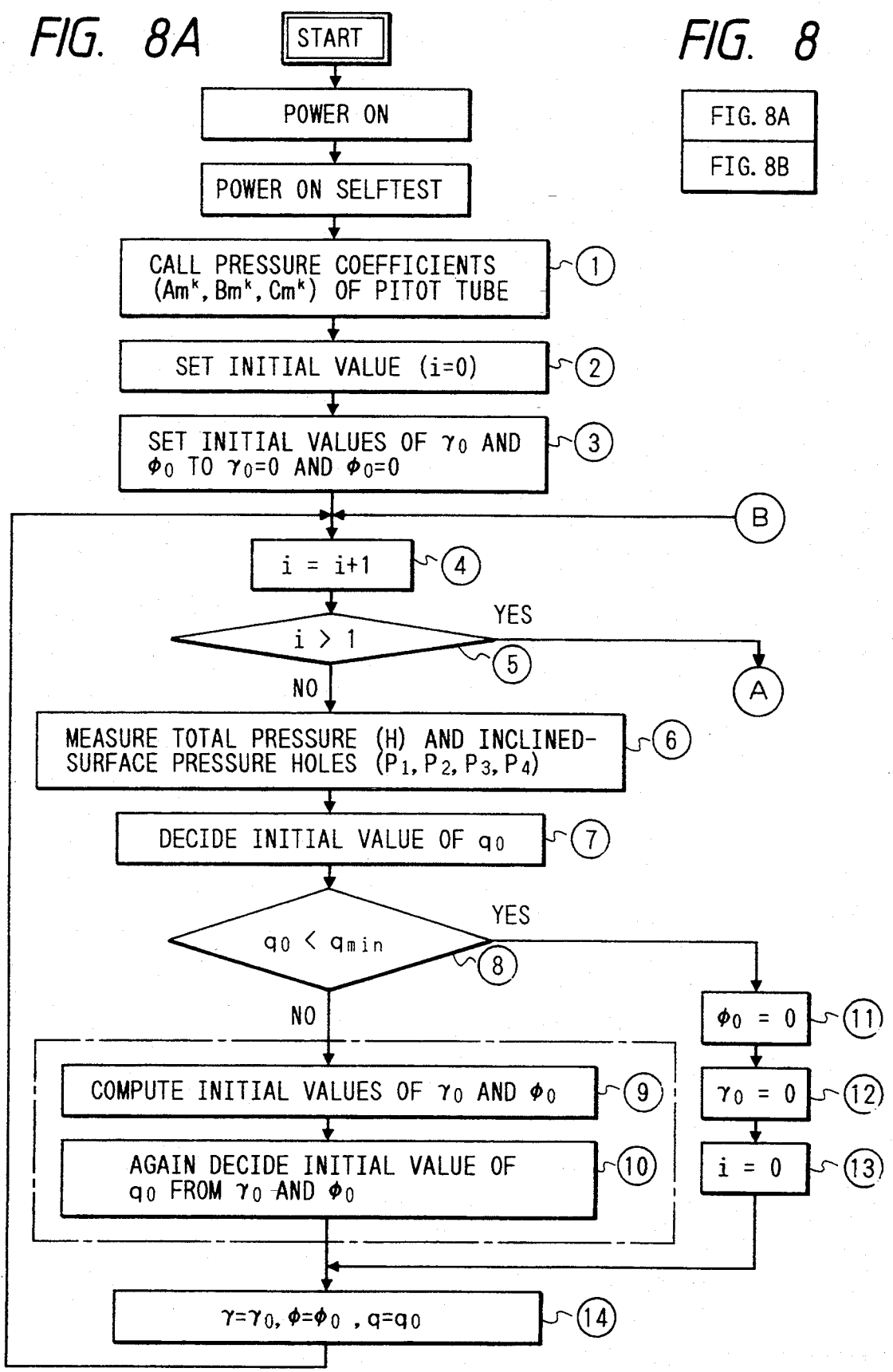

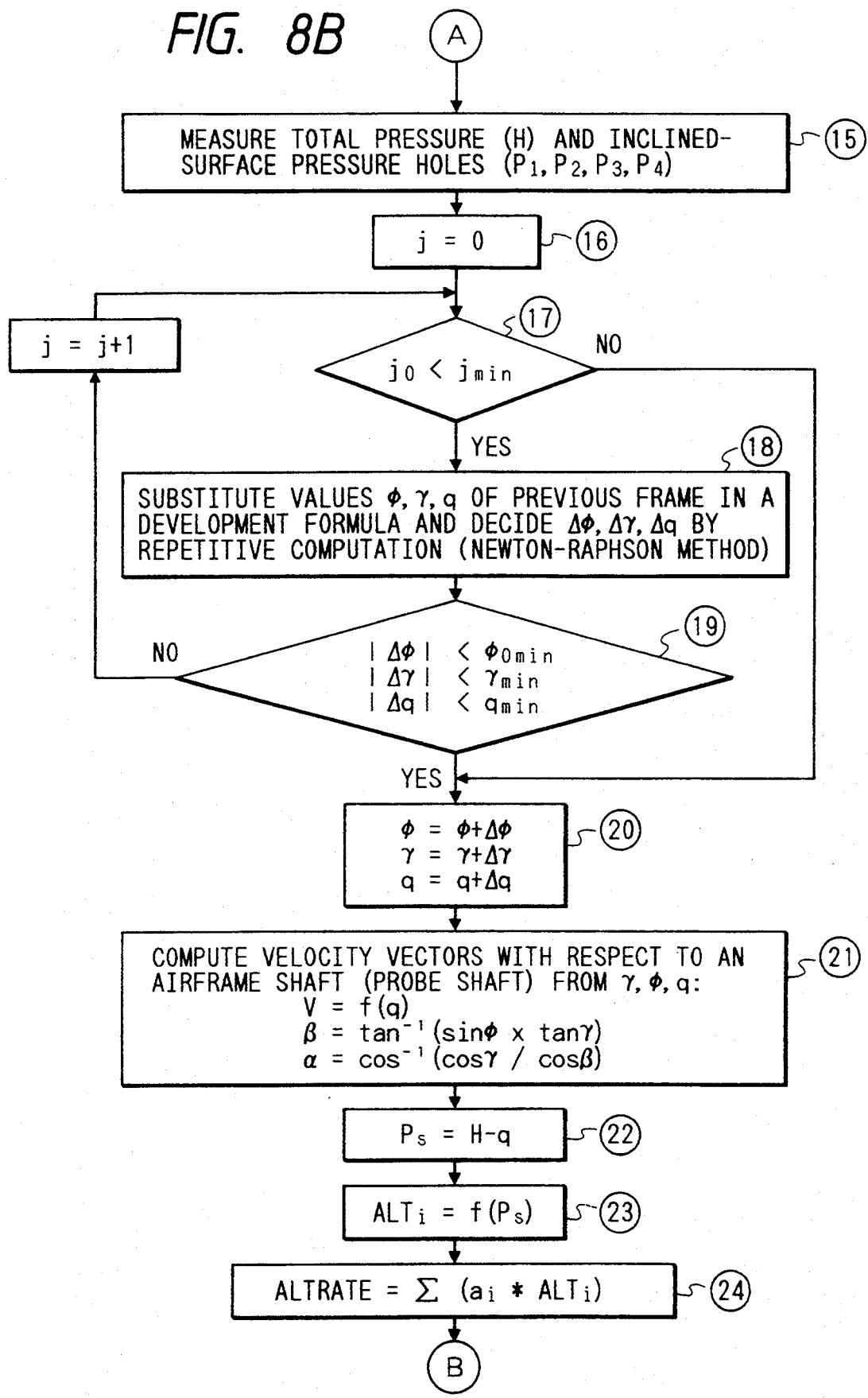

TRUNCATED PYRAMID-SHAPE MULTI-HOLE PITOT PROBE AND FLIGHT VELOCITY DETECTION SYSTEM USING SAID TRUNCATED PYRAMID-SHAPE MULTI-HOLE PITOT PROBE

This application is a continuation of application Ser. No. 08/044,065, filed Apr. 6, 1993, now abandoned.

FIELD OF THE INVENTION

The present invention relates to a truncated pyramid-shape multi-hole Pitot probe and a flight velocity detection system using said truncated pyramid-shape multi-hole Pitot probe and, more particularly, to a flight velocity detection system of the type which can be loaded on a real plane. The invention can be applied to the detection of the flight velocity vector with respect to an airframe axis (or a probe axis) and an air flight velocity vector and can also be applied to the detection of the velocity vector of a model placed within a wind tunnel and a back-wash traverse.

DESCRIPTION OF THE RELATED ART

In the past, as airflow probes for detecting airflow information, there has been known a six-hole spherical Pitot tube probe 70 with static pressure holes having a spherical end as shown in FIG. 11a and FIG. 11b, a composite velocity vector probe 75 comprised of an integrated combination of a Pitot static pressure tube probe 76, an attack-angle ($\alpha$) detecting blade type probe 77 and a yawing-angle ($\beta$) detecting blade type probe 78, as shown in FIG. 12, and so on. There has been also known a flight velocity detection system in which airflow information obtained from these airflow probes, atmospheric temperature information and attitude azimuth information obtained from an attitude azimuth reference apparatus such as a vertical gyro, a directional gyro or the like are connected to obtain an airflight velocity. However, the aforesaid flight velocity detection system is merely used mainly for an experimental plane or a fighter plane. The velocity detection system which uses a single detection probe to detect velocity vectors (velocity and wind-direction) has not yet been put to practical use for a general aircraft.

The reason therefor is because of a problem encountered in the airflow probe. In the conventional airflow probe, the pressure coefficients ($f(\alpha)$, $f(\beta)$) of the attack angle $\alpha$ and the yawing angle $\beta$ can be decided by making a pressure difference ($P_1-P_3$) detected by vertical holes and a pressure difference ($P_2-P_4$) detected by horizontal holes undimensional by the total pressure and further making it undimensional with respect to the set attack angle and yawing angle. However, since the total pressure H has a large non-linearity with respect to those angles, it is necessary to provide the respective pressure coefficients ($f(\alpha)$, $f(\beta)$) by flight velocity or to correct the velocity. Because of this, it becomes very complicated to detect a velocity vector. Particularly, when the plane flies while being subjected to a strong crosswind, complicated correction with respect to the velocity and the wind direction is necessary. Therefore, it has been difficult to load the system on a general aircraft.

On the other hand, the composite velocity vector probe, as shown in FIG. 12, has a drawback in that since the blade for an airflow angle is supported by supports 79 and 80 through a hinge portion while taking a turning motion into consideration, the balance becomes lost during the flight due to disturbances, vibration of the supports, freezing, or the like so that the blade fails to capture an accurate airflow angle.

Further, in the conventional multi-hole spherical Pitot tube probe, pressure holes $72_1$ to $72_4$ for detecting the direction of wind constitute small holes in four directions of the spherical surface. If the pressure hole is only one small hole, in the case where even one hole becomes clogged with insects, a cloud of dust and so on, the probe possibly fails to function. In the multi-hole spherical Pitot tube probe, the arrangement of pressure holes on the curved surface for detecting the direction of wind and the diameter of holes influence on the accuracy of detection of wind-direction. Therefore, if the hole diameter is large, an error in pressure detection increases, thus posing a problem in that the hole diameter cannot be made large in order to prevent clogging.

SUMMARY OF THE INVENTION

An object of the present invention is to provide a flight velocity detection system loaded on an actual plane, which is less influenced by the pressure coefficient caused by variation of velocity, requires no complicated correction or the like, can obtain velocity vector information with high accuracy in the range of a wide angle, processes this information to easily obtain a flight velocity vector with respect to an airframe axis and can be loaded on a wide range of airplanes, including general aircraft, including a vertical take-off type plane, such as a helicopter, and a supersonic plane, including a spacecraft.

Another object of the present invention is to provide a truncated pyramid-shape multi-hole Pitot probe which is small in Reynold's effect of a pressure hole for detecting a wind-direction, that is, an influence of pressure coefficient in variation of velocity, requires no complicated correction or the like, can detect velocity vector information with high accuracy in the range of a wide angle, and possibly incurs no defective measurement due to clogging, vibrations and the like.

For solving the aforementioned problems, the present invention has studied various flow conditions using a wind tunnel to achieve the present invention. That is, in a conventional axisymmetric multi-hole spherical Pitot tube probe, the diameter and arrangement of pressure holes on the curved surface for detecting wind direction affect the accuracy of detection of wind direction. Therefore, it is not possible to suitably provide a plurality of holes in the curved surface while also making the hole diameter larger. On the other hand, in a truncated pyramid-shape multi-hole Pitot tube probe, the wind direction is determined by inclination and arrangement of a truncated pyramid surface with respect to an axis, unlike the axisymmetric spherical probe. Therefore, it is not necessary to provide pressure coefficients by flight velocities or to correct the velocity. The velocity vector can be calculated easily and accurately as compared with prior art. In addition, it is possible to provide a composite hole in each truncated pyramid surface.

The flight velocity detection system using a truncated pyramid-shape multi-hole Pitot probe according to the present invention for achieving the aforementioned objects comprises a truncated pyramid-shape multi-hole Pitot probe in which an extreme end portion has a truncated pyramid-shape, and a cylindrical hole is provided at the apex thereof. A total pressure tube of a diameter smaller than that of the hole is secured at a position by a predetermined length determined by a relationship with the diameter of the cylindrical hole inside from the extreme end of said cylindrical hole, and several pressure holes are arranged in each of the truncated pyramid surface of said truncated pyramid shape. Each piece of pressure information detected by said probe is led to a manifold that forms a composite hole, and then the pressure information thereof is input into a velocity vector processor and converted into an electric signal. A pressure coefficient for each hole of said probe with respect to the velocity vector pre-stored in said velocity vector processor is used to process the signal whereby the flight velocity vector components (V, $\alpha$, and $\beta$) with respect to a probe axis are calculated from said pressure information and the air density.

Further, a truncated pyramid-shape multi-hole Pitot probe according to the present invention has a structure in which an extreme end portion has a truncated pyramid-shape, a cylindrical hole is provided at the apex thereof, and a total pressure tube of a smaller diameter than that of the hole is secured at a position by a predetermined length determined by a relationship with the diameter of the cylindrical hole inside from the extreme end of said cylindrical hole. Several pressure holes are arranged in each of the truncated pyramid surfaces of said truncated pyramid shape, where a plurality of said pressure holes in each of said truncated pyramid surfaces is formed.

With the above-described structure, a constant total pressure, even in the presence of a strong crosswind, is obtained. It is possible to be free from trouble due to the clogging of pressure holes, and from large Reynolds number effects; and even under an extreme flight condition, stable pressure information for the velocity vector can be provided.

In the truncated pyramid-shape multi-hole Pitot probe of the present invention, the relationship between a difference between a total pressure H detected by the total pressure hole and a pressure Pk on each truncated pyramid surface (k is a subscript representative of a pressure hole in a truncated pyramid surface; for example, in a case of a truncated pyramid-shape with four surfaces, k=1, 2, 3, 4), a dynamical pressure (q) and wind directions ($\gamma$, $\phi$) are assumed to be given by the following formulae:

$$H - Pk = q \{A_1^k + A_2^k\gamma^1 + A_3^k\gamma^2 + A_4^k\gamma^3 + \quad (1)$$
$$(B_1^k + B_2^k\gamma^1 + B_3^k\gamma^2 + B_4^k\gamma^3)\cos(\phi) +$$
$$(C_1^k + C_2^k\gamma^1 + C_3^k\gamma^2 + C_4^k\gamma^3)\sin(\phi)\}$$
$$H - Pk = q \{a_1^k + a_2^k\gamma^2 + a_3^k\gamma^4 + a_4^k\gamma^6 + \quad (1')$$
$$(b_1^k\gamma + b_2^k\gamma^3 + b_3^k\gamma^5 + b_4^k\gamma^7)\cos(\phi) +$$
$$(c_1^k\gamma + c_2^k\gamma^3 + c_3^k\gamma^5 + c_4^k\gamma^7)\sin(\phi)\}$$

The above-described expansion formulae (1) and (1') are used in the following manner. For example, in an axisymetric tubular probe, the low-order expansion formula (1) will suffice, but in case of a large-diameter probe or of asymmetrical probe, the high-order expansion formula (1') is preferable. In the above-described formula (1) or (1'), $A_1^k$ to $A_4^k$, $B_1^k$ to $B_4^k$, $C_1^k$ to $C_4^k$ or $a_1^k$ to $a_4^k$, $b_1^k$ to $b_4^k$, $c_1^k$ to $c_4^k$ denote the pressure coefficients of the composite pressure hole of each truncated pyramid surface of the truncated pyramid-shape multi-hole Pitot probe. From known flow conditions such as the ones existing in a wind tunnel, various items of pressure information detected by the truncated pyramid-shape multi-hole Pitot probe with respect to a set speed vector are obtained as quantities which are made to be nondimensional using the reference dynamic pressure and stored in advance in a ROM of a flight vector analyzer.

Simultaneous equations of the number of truncated pyramid surfaces comprised of the aforementioned formula (1) or (1') are obtained from the coefficients of said pressures sequentially read out from the ROM and pressure information obtained from the pressure holes of each truncated pyramid surface. These can be solved by an iterative scheme such as Newton-Raphson method or the like to thereby calculate three unknown numbers, a dynamic pressure (q) and wind directions ($\gamma$, $\phi$).

When the wind directions ($\gamma$, $\phi$) are obtained, the attack angle e and the yawing angle $\beta$ are obtained by the formulae below:

$$\cos \alpha = \cos \beta / \cos \beta \quad (2)$$
$$\tan \beta = \sin \phi \tan \gamma \quad (3)$$

Assuming incompressible flow, a difference between the total pressure H obtained by the truncated pyramid-shape multi-hole Pitot probe and the dynamic pressure q is the static pressure Ps at the flight altitude. Thus, the following relation is established:

$$H - q = Ps \quad (4)$$

Accordingly, the static pressure of the air at the flight altitude is obtained by calculating the difference between the detected total pressure (H) and dynamic pressure (q), and the altitude can be calculated. Further, if the outside air temperature can be obtained by a temperature sensor to thereby calculate the true airspeed, the calibrated air speed and the Mach number are primarily calculated from the dynamic pressure, and the speed vector components (V, $\alpha$, $\beta$) with respect to the airframe shaft are obtained.

Moreover, the speed vector (V, $\alpha$, $\beta$) with respect to the airframe axis obtained by the truncated pyramid-shape multi-hole Pitot probe is used with the signals obtained from an attitude azimuth reference device composed of a vertical gyro and a directional gyro to give the airplane attitude information with respect to the earth.

BRIEF DESCRIPTION OF THE DRAWINGS

FIG. 1 is a block diagram showing an embodiment of the flight velocity detection system according to the present invention;

FIG. 8 consisting of FIG. 8A and FIG. 8B show a flow chart of a partial program for calculating speed vectors stored in ROM in the flight velocity vector detection system according to the present invention;

DESCRIPTION OF THE PREFERRED EMBODIMENTS

Figure 2A:
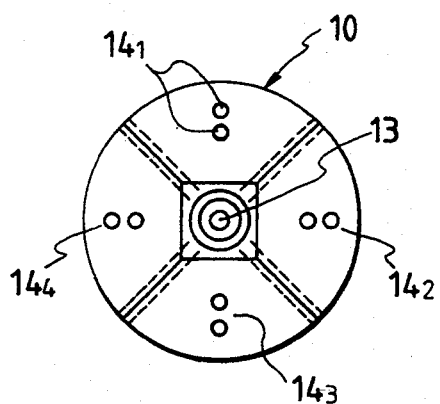
FIG. 2(a) is a front view of the truncated pyramid shape multi-hole Pitot probe.
Figure 2B:
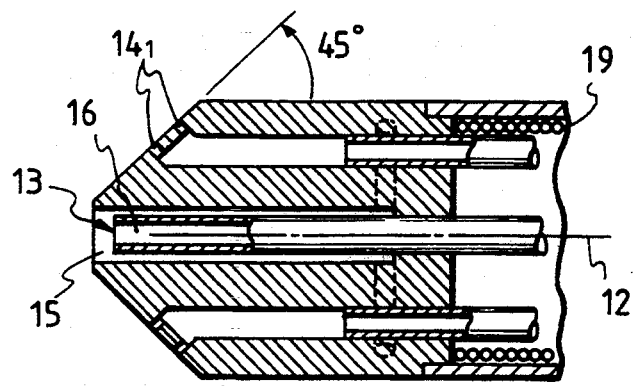
FIG. 2(b) is a side sectional view thereof.

FIG. 1 is a block diagram of the flight velocity vector detection system using the Pitot probe according to the present invention. In the figure, reference numeral 1 designates a square truncated pyramid-shape Pitot probe, a specific embodiment of which is shown in FIG. 2. This square truncated pyramid-shape Pitot probe is a truncated pyramid-shape multi-hole Pitot probe analogous in basic construction to the square truncated pyramid-shape Pitot probe (see Japanese Patent Publication No. 4666/1988 publication) previously proposed by the present inventor. The probe of the present invention includes a composite hole comprising one or more pressure holes in each pyramid surface.

More specifically, the square truncated pyramid-shape Pitot probe 1 in the present embodiment is comprised of a square truncated pyramid-shape Pitot tube 10 having five holes whose head has a square truncated pyramid. The extreme end of a Pitot tube is shaved into a square truncated pyramid at an angle of 45° with respect to an axis 12, an apex of which is formed a shield type total pressure tube portion 13, and in each of the square pyramid surfaces are formed a plurality (two in series in the center in the present embodiment) of groups of pressure holes $14_1$, $14_2$, $14_3$ and $14_4$. The shield type total pressure tube portion 13 has, internally of a cylindrical hole 15 provided at the apex of the square truncated pyramid, a total pressure tube 16 of a diameter smaller than that of said hole, said total pressure tube 16 being fixed at a position by a predetermined length determined from a relation with the diameter from the extreme end of the cylindrical hole. At the bottom end of the cylindrical hole 15 is provided a branch hole which allows the pressure within the cylindrical to leak, which opens to a position along a ridgeline of the square pyramid. Accordingly, the Pitot tube is positioned in the three-dimensional flow field whereby the total pressure H of the total pressure tube 16 in the middle of the extreme end of the Pitot tube and pressures $P_1$, $P_2$, $P_3$ and $P_4$ of the groups of pressure holes $14_1$, $14_2$, $14_3$ and $14_4$ on the square pyramid surfaces are measured, and the flow speed vectors can be obtained from the total pressure H and the differentials $(H-P_1)$, $(H-P_2)$, $(H-P_3)$ and $(H-P_4)$. A heater 19 is housed in the Pitot tube to prevent frost accumulation.

Reference numeral 2 designates a velocity vector processor for processing pressure information obtained from said square truncated pyramid-shape Pitot tube probe 1. The processor includes pressure converters 3 for converting pressure information into an electric signal, an input port 4 for receiving signals from an attitude azimuth reference device 8, which will be described later, a CPU 5, a ROM 6 for storing therein pressure coefficients, velocity vector analyzing programs and the like, and an output port 7.

The total pressure H detected by said square truncated pyramid-shape Pitot tube 10 and the pressures $P_1$, $P_2$, $P_3$ and $P_4$ on the square pyramid surfaces are introduced into the pressure converters 3, where these pressures are converted into electric signals corresponding to the pressures and sent to the CPU 5 through the input port 4. In the CPU 5, these pressure informations are arranged into differentials $Ps_1=(H-P_1)$, $Ps_2=(H-P_2)$, $Ps_3=(H-P_3)$, $Ps_4=(H-P_4)$ between the total pressure H and each of the square pyramid surface pressures. On the other hand, pressure coefficients $A_1^k$ to $A_1^k$, $B_1^k$ to $B_4^k$, and $C_1^k$ to $C_1^k$ of the square truncated pyramid-shape Pitot probe are obtained in advance by experiments in the wind tunnel or the like and stored in the ROM 6. In the case where the pressure converters are of the differential type, the differentials $Ps_1$, $Ps_2$, $Ps_3$ and $Ps_4$ are sent to CPU 5 from the pressure converters. Therefore, the differentials need not be calculated by the CPU.

Accordingly, the pressure information obtained from the total pressure H measured by the Pitot tube probe and the pressures $P_1$, $P_2$, $P_3$ and $P_4$ on the square pyramid surfaces are converted into electric signals and input into the CPU whereby the CPU performs a calculation in accordance with the program to obtain speeds (calibrated speed, equivalent airspeed, true airspeed), an attack angle, and a yawing angle. The calibrated speed is obtained from the dynamic pressure, and the true airspeed can be obtained from the dynamic pressure, static pressure and atmospheric temperature measured by a temperature sensor 27. The altitude is obtained from the static pressure to thereby derive the rate of climb. The Mach number is obtained from the dynamic pressure and static pressure.

In the present embodiment, the velocity vector (V, α, β) with respect to the airframe axis obtained from the square truncated pyramid-shape Pitot tube probe is connected with a pitch-angle signal, a roll-angle signal and a yaw-angle signal obtained from the attitude azimuth reference device 8 comprised of a vertical gyro and a directional gyro separately loaded on the plane to obtain the aircraft attitude information. That is, the attitude azimuth reference device 8 comprises a vertical gyro 21 and a directional gyro 22 and three converters 23, 24 and 25 for converting a pitch-angle signal, a roll-angle signal and a yaw-angle signal obtained therefrom into electric signals. These signals are then input into the input port 4 of a truncated pyramid-shape Pitot tube signal processor 2 and introduced into the CPU. In the CPU, these pitch-angle signal, roll-angle signal and yaw-angle signal are connected with a roll angle φ calculated from the data obtained from the square truncated pyramid-shape Pitot tube probe to calculate angular velocities of three shafts therefrom.

The rate of climb, Mach number, airspeed, flight path angle, attack angle, yaw angle and angular velocities with respect to three coordinate axes calculated within the CPU in the manner described above are output to output units 9, including relevant devices such as a display unit, through the output port 7.

Figure 10A:
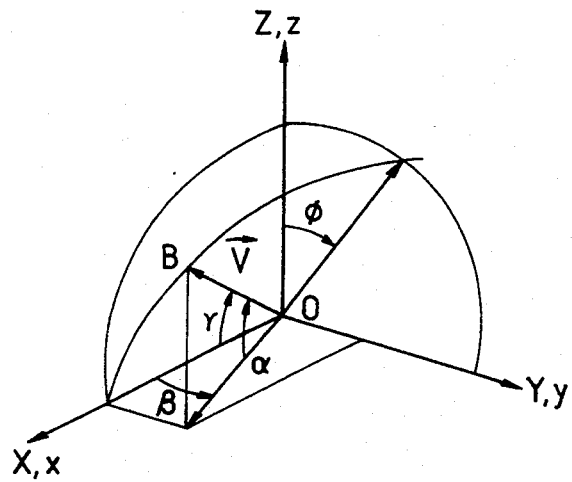
FIG. 10a and FIG. 10b are explanatory views of a coordinate system which comprises the basis of a speed vector analyzing procedure.
Figure 10B:
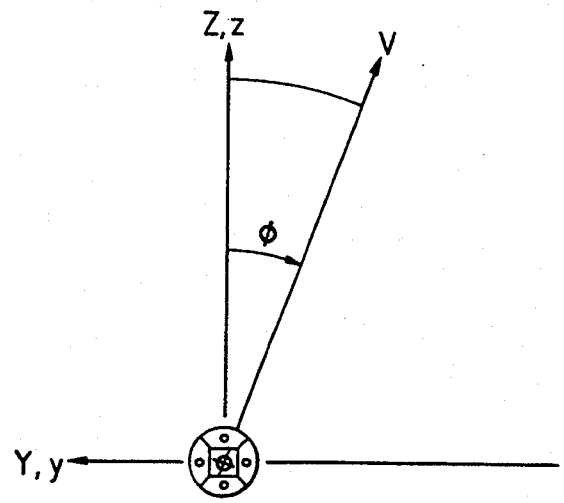
Figure 11A:
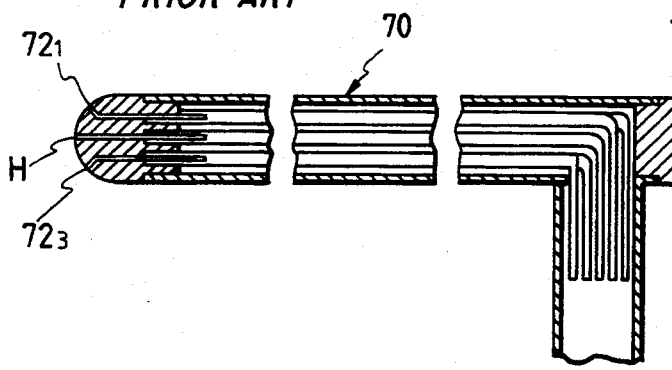
FIG. 11(a) is a side view of a conventional a five-hole spherical Pitot tube.
Figure 11B:
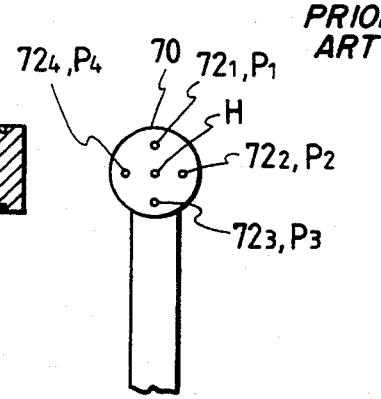
FIG. 11(b) is a front view thereof.
Figure 12:
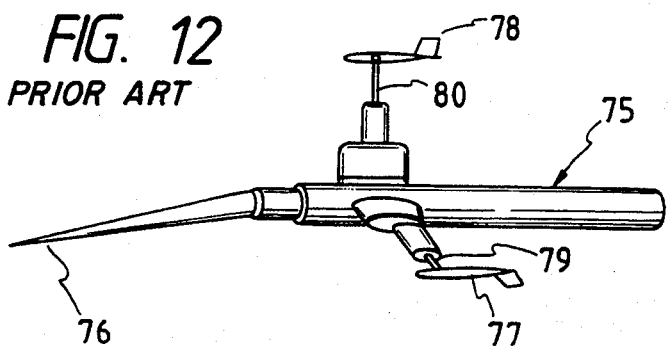
FIG. 12 is a side view of a conventional composite speed vector probe.

The analysis of the velocity vector in the present invention is carried out on the basis of coordinate systems, as shown in FIG. 10 in which a coordinate system fixed in space is indicated by X, Y and Z, and a Cartesian coordinate system fixed to the probe axis is indicated by x, y and z, the x axis being identical with the X axis, the Z axis being located on a straight line passing through the center between a first hole and a third hole positioned symmetrically to each other out of four holes provided in the pyramid surfaces of the probe, and the Y axis being vertical to the former two axes. In the aforementioned coordinate system, the direction of the velocity vector V is indicated by OB, the angle formed between the velocity vector and the probe shaft (axis x) is indicted by $\gamma$, and the angle formed between the projection OC of the velocity vector V to the ZY surface and the axis is indicated by $\phi$.

When an expansion formula (H-Pk)/q in connection with the $k^{th}$ pressure hole is written in the form of a series in connection with $\gamma$ and a cosine trigonometric series in connection with $(\delta k - \phi)$, the following is given from the above-described formula (1):

$$q\{A_1^k + A_2^k\gamma + A_3^k\gamma^2 + A_4^k\gamma^3) + \qquad (5)$$
$$(B_1^k + B_2^k\gamma + B_3^k\gamma^2 + B_4^k\gamma^3)\cos(\phi) +$$
$$(C_1^k + C_2^k\gamma + C_3^k\gamma^2 + C_4^k\gamma^3)\sin(\phi)\} =$$
$$H - Pk = f^k(q,\gamma,\phi)$$

In the case of the square truncated pyramid-shape probe, k=1 to 4. Thus, there are four equations corresponding to the aforesaid formula (5), and a system of four simultaneous equations result. Here, unknown quantities are 1, $\gamma$, and $\phi$.

The pressure coefficients $A_i^k$, $B_i^k$ and $C_i^k$ are determined in advance, and initial values $q_o$, $\gamma_o$ and $\phi_o$ of q, $\gamma$, $\phi$ can be derived from the pressure information. The aforesaid four simultaneous equations are repeatedly solved by a Newton-Raphson method, and as differences $\Delta q$, $\Delta\gamma$, and $\Delta\phi$ between the successive iterations become sufficiently small, the following converged values are obtained:

$$q=q_o+\Delta q, \quad \gamma=\gamma_o+\Delta\gamma, \quad \phi=\phi_o+\Delta\phi \qquad (6)$$

In connection with the initial values in the Newton-Raphson method, and assuming that four groups of pressure holes (k=1, 2, 3, 4) of the pyramid surfaces of the probe are arranged by a 90° separation, and the pressure coefficients of four groups of pressure holes are assumed to be the same or very similar, the initial values $\phi_o$, $q_o$ and $\gamma_o$ of q, $\gamma$, and $\phi$, respectively, can he obtained by the following formulae:

$$\phi_o = \mathrm{Tan}^{-1}\frac{P_4 - P_2}{P_2 - P_1} \pm \frac{n}{4} \times \pi \qquad (7)$$

$$\gamma_o = \frac{2A_1\Delta_2}{B_2\Delta_1} \qquad (8)$$

where, $\qquad (9)$ $\Delta_1 = \{4H - (P_1 + P_2 + P_3 + P_4)\} \times$
$(\cos\phi_o + \sin\phi_o)$ $\Delta_2 = \{(P_1 + P_2) + (P_3 + P_4)\} \qquad (10)$ $$q_o = \frac{4H - (P_1 + P_2 + P_3 + P_4)}{(A_1 + A_2^k\gamma_o^1 + A_3^k\gamma_o^2 + A_4^k\gamma_o^3)} \qquad (11)$$

When the initial values are decided as described above, the aforesaid initial values are used from next time, and the procedure for deciding the initial values every time is omitted to speed up the arithmetic process.

When the unknown numbers q, $\gamma$, and $\phi$ are obtained, the components of the flight velocity vector, $\alpha$, $\beta$, and V can be obtained by the following formulae:

$$\alpha=\cos^{-1}(\cos\gamma/\cos\beta) \qquad (12)$$

$$\beta=\tan^{-1}(\sin\phi\times\tan\gamma) \qquad (13)$$

$$V=\sqrt{(2q/\rho)} \qquad (14)$$

The programs for executing the above-described analyzing procedure are stored in ROM 6 of the velocity vector processor 2 and are shown in a flow chart of FIG. 8. The velocity vector analyzing programs can be stored in a ROM separately from the ROM in which pressure coefficients are stored.

The programs will be described below with reference to the flow chart of FIG. 8.

When a program starts, pressure coefficients $A_1^k$ to $A_4^k$, $B_1^k$ to $B_4^k$, and $C_1^k$ to $C_4^k$ stored in ROM 6 are first called (Step (1)). Then i is made equal to 0 (i=0) and an initial value of i is set (Step (2)), and initial values of $\gamma_o$ and $\phi_o$ are set to $\gamma_o=0$ and $\phi_o=0$ (Step (3)). Next calculation of i=i+1 is conducted (Step (4)) to judge if i>1 (Step (5)). When i=1 it is No, and the process proceeds to Step (6).

In Step (6), the pressure information from the probe, and the measured values of the total pressure H, and pyramid surface pressures $P_1$, $P_2$, $P_3$ and $P_4$ are read. In Step (7), the initial value $q_o$ of the dynamic pressure q is calculated by the aforesaid formula (11) from these measured values. In this case, in Step (3), $\gamma_o=0$ and $\phi=0$ have been set, and therefore, the following equation can be used for calculation:

$$q_o = \frac{4H - (P_1 + P_2 + P_3 + P_4)}{A_1^k}$$

In Step (8), $q_o$ is compared with the minimum value $q_{min}$ of the dynamic pressure preset as the lowest limit of the useable range. When $q_o$ is larger than the minimum value, the precess proceeds to Step (9), where $\phi$, the initial value of $\gamma_o$ of $\gamma$ and $\phi_o$ are calculated on the basis of the above-described formulae (7) and (8), on the basis of which $q_o$ is again obtained in Step (10). The initial values of $\phi$, $\gamma$, and q are decided in Step (14). $\gamma_o$ is calculated by the formula (8), and in Step (8), $q_o$ is calculated by the formula (11). In Step (8), when the flight velocity is extremely low and $q_o$ is smaller than the minimum value $q_{min}$ of the dynamic pressure preset as a threshold, the process proceeds to Steps (11) and (12) where $\phi_o=0$ and $\gamma_0=0$ are set. In Step (13), i=0 is set. The process again returns to Step (5) from Step (4) without employing the respective initial values obtained by the above-described Steps (9) and (10). Calculation of Steps (6) to (8) is repeated, and such a routine is repeated till the speed exceeds a predetermined speed and $q_o$ is larger than $q_{min}$.

$q_o$ becomes larger than $q_{min}$ and $\phi_o$, $\gamma_o$ and $q_o$ are calculated in Steps (9) and (10), as described above. In Step (14), the initial values $\phi_o$, $\gamma_o$ and $q_o$ are set. When $\phi_o$, $\gamma_o$ and $q_o$ are set, the process returns to Step (4), where i=1 is set, and i=2 is obtained which is larger than 1. Therefore, the process proceeds to Step (15) from step (5). The process proceeds from a routine for obtaining initial values to a routine for obtaining $\phi$, $\gamma$ and q on the basis of said initial values. In Step (15), measured values of the total pressure H and pyramid surface pressures $P_1$, $P_2$, $P_3$ and $P_4$ actually measured by the truncated pyramid-shape Pitot tube probe are read, and an iteration number j of an iterative computation by the Newton-Raphson method is set to j=0 (Step (16)). In Step (17), the j is compared with a preset maximum iteration number $j_{min}$. When j is smaller than $j_{min}$, the process proceeds to Step (18). In Step (18), $\phi_o$, $\gamma_o$ and $q_o$ are substituted in four simultaneous equations on the basis of the formula (5) to decide $\Delta\phi$, $\Delta\gamma$, and $\Delta1$. The iterative computation is conducted while successively renewing $\phi_o$, $\gamma_i$ and $q_i$ till $\Delta\phi$, $\Delta\gamma$ and $\Delta q$ are smaller than $\phi_{min}$, $\gamma_{min}$, and $q_{min}$ or till the set predetermined iteration number is exhausted. After this, the process proceeds to Step (20) where $\phi$, $\gamma$, and q are decided by the formula (6) as the convergence values of $\phi$, $\gamma$, and q.

After $\phi$, $\gamma$, and q have been obtained for the first time as described above, velocity vectors $\alpha_1$, $\beta_1$ and $V_1$ with respect to the airframe axis are computed by the abovedescribed formulae (12), (13) and (14) in Step (21).

In the succeeding Step (22), the static pressure $P_s$, is calculated from the total pressure H and the dynamic pressure q. In Step (23), the altitude is calculated from the static pressure. In Step (24), the rate of climb is obtained. The process returns to Step (4) for starting the second iterative computation. These flight information items are output to the display unit for display through the output port 7 (FIG. 1).

Since i is set to 2,3, . . . in the second time measurements and thereafter, computation of initial values by Steps (5) to (14) is not conducted but routines of Steps (15) to (24) are repeated. The previous values are employed as the initial values, and $\phi$, $\gamma$, and q are obtained by the iterative computation according to the iterative method in a manner similar to that described above, whereby the components of the velocity vector $\alpha$, $\beta$, V, altitude and the rate of climb at that time are calculated and sequentially displayed.

Accordingly, since computation of the initial values after the second time is omitted, the computation routine is short and calculation of velocity vector is speeded up, as a result of which a continuous graphic display can be realized.

In the flow chart in the above-described embodiment, initial values $\phi_o$, $\gamma_o$ and $q_o$ of $\phi$, $\gamma$ and q are decided by the formulae (7) to (11). However, in the case of square truncated pyramid-shape Pitot tube, initial values $\phi_o$, $\gamma_o$, and $q_o$ can be decided simply according to the method as described below.

Out of the groups of pressure holes $P_1$, $P_2$, $P_3$ and $P_4$ of the square truncated pyramid-shape Pitot tube, the differential ($P_1-P_3$) between upper and lower pressure holes follows a variation of angle $\alpha$, and the differential ($P_2-P_4$) between lateral pressure holes follows a variation of angle $\beta$. It has been confirmed as the result of experiments that both of them change linearly with the respective angle up to about 30°. Furthermore, it has also been confirmed that the total pressure H changes little until approximately 26° with respect to the change of the airflow setting angle $\gamma$. From these facts, in the range in which $\alpha$, $\beta$ and total pressure change linearly, $\alpha$ is proportional to $(P_1-P_3)/\{H-\frac{1}{4}(P_1+P_2+P_3+P_4)\}$ and $\beta$ is proportional to $(P_2-P_4)/\{H-\frac{1}{4}(P_1+P_2+P_3+P_4)\}$ Let $C\alpha$ and $C\beta$ be the proportional constant, the following formulae are obtained:

$$\alpha_o = c\alpha \cdot \frac{(P_1 - P_3)}{H} \rightarrow \alpha_o = c\alpha \frac{(P_1 - P_3)}{\{H - \frac{1}{4}(P_1 + P_2 + P_3 + P_4)\}} \quad (15)$$

$$\beta_o = c\beta \cdot \frac{(P_2 - P_4)}{H} \rightarrow \beta_o = c\beta \frac{(P_2 - p_4)}{\{H - \frac{1}{4}(P_1 + P_2 + P_3 + P_4)\}} \quad (16)$$

Repetitive experiments were conducted varying the angle of the probe axis with respect to the airflow direction in a wind-tunnel test on the basis of the above-described formulae. It has been confirmed as the result thereof that $C\alpha$ and $C\beta$ exhibit almost constant values and the above-described formulae (15) and (16) are realized. Accordingly, $\alpha_o$ and $\beta_o$ in the above-described formulae are employed as the initial values of $\alpha$ and $\beta$, and these are substituted in the formulae (12) and (13) to obtain $\phi$ and $\gamma$, which values can be employed as the initial values $\phi_o$ and $\gamma_o$ of the iterative computation method of the above-described formula (5). Thereby, computation of initial values is simplified, so that the calculation speed of the initial values can be enhanced.

Figure 9:
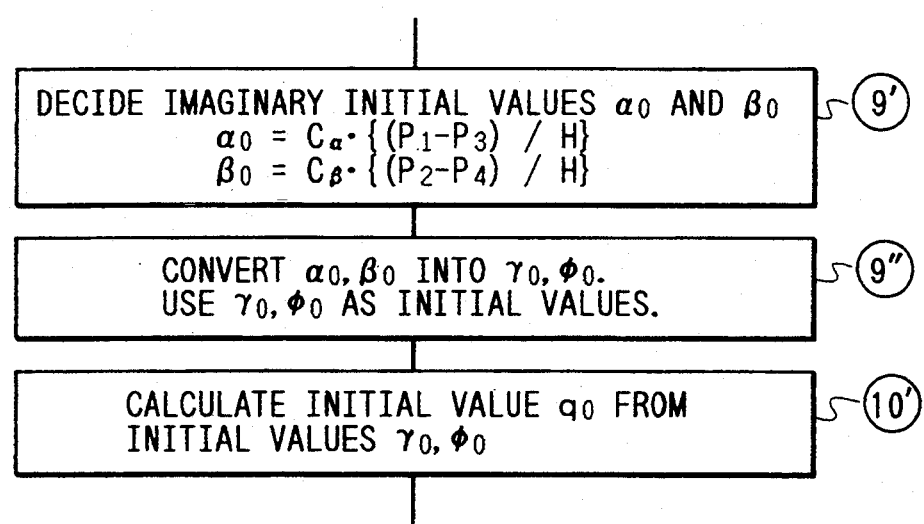
FIG. 9 is a part of a flow chart showing another embodiment of the flow chart shown in FIG. 8A and FIG. 8B.

FIG. 9 shows a flow chart of the corresponding portions in the case where initial $\phi_o$, $\gamma_o$, and $q_o$ are decided by the aforementioned method, which extracts only portions corresponding to those of Steps (9) and (10) in the flow chart of FIG. 8 and other steps are similar to those shown in FIG. 8. That is, in Step (9'), $\alpha_o$ and $\beta_o$ are computed by the formulae (15) and (16); in Step (9''), $\phi_o$ and $\gamma_o$ are obtained on the basis of the formulae (12) and (13) from $\alpha_o$ and $\beta_o$; and in Step (10), $q_o$ is calculated on the basis of the formula (11) from $\phi_o$ and $\gamma_o$.

Figure 3:
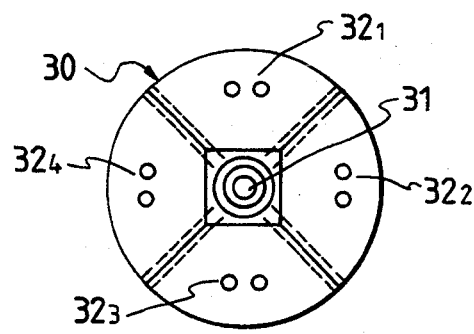
FIG. 3 is a front view showing a further embodiment of the truncated pyramid-shape multi-hole Pitot probe according to the present invention.
Figure 4:
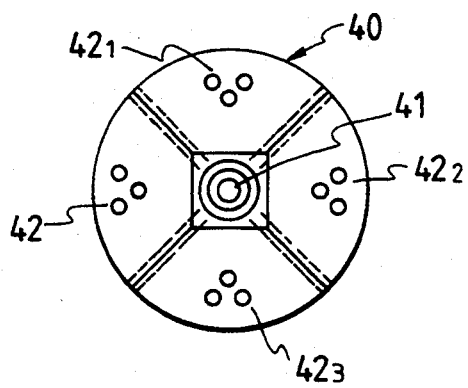
FIG. 4 is a front view showing another embodiment of the truncated pyramid-shape multi-hole Pitot probe according to the present invention.
Figure 5:
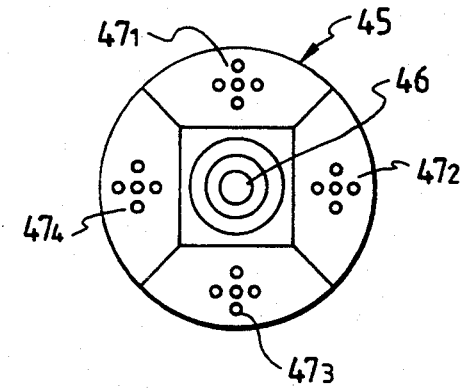
FIG. 5 is a front view of still another embodiment of the truncated pyramid-shape multi-hole Pitot probe according to the present invention.

While one embodiment of the present invention has been illustrated, it is to be noted that the present invention is not limited to the above-described embodiment. For example, the pressure holes arranged in the square truncated pyramid surfaces of the square truncated pyramid-shape Pitot probe need not always be two in series in the center. Instead, two holes may be provided in parallel, as shown in FIG. 3, or three holes may be arranged as shown in FIG. 4, or five holes may be provided as shown in FIG. 5. Their arrangement and number can be suitably changed. By arrangement of a large number of holes, the influence resulting from clogging of a single hole can be further reduced. In FIGS. 3 to 5, reference numerals 30, 40 and 45 respectively denote the square truncated pyramid-shape Pitot probes; 31, 41 and 46 respectively denote total pressure tubes; and $32_1$, $32_2$, $32_3$, $32_4$, $42_1$, $42_2$, $42_3$, $42_4$, $47_1$, $47_2$, $47_3$ and $47_4$ respectively denote groups of pressure holes of pyramid surfaces.

Figure 6:
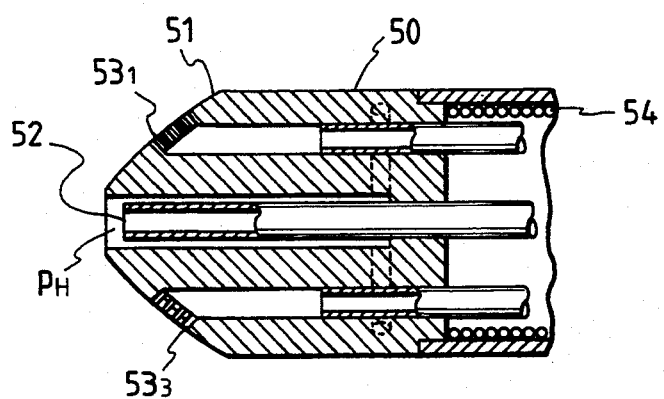
FIG. 6 is a side sectional view showing another embodiment of the truncated pyramid-shape multi-hole Pitot probe according to the present invention.

FIG. 6 shows a further embodiment of a square truncated pyramid-shape Pitot probe, which is a truncated pyramid-shape Pitot probe which can be used in the transonic region and above which is accompanied by compression to generate shock waves. The probe 50 is designed so that a rear edge portion 51 of a pyramid surface of the aforementioned probe is outwardly curved so as to be parallel with the axis of the probe, and the locations of the generation of the head shock wave generated at the probe-shape front edge and the inflated wave generated at a heteromorphous region of the rear edge portion of the pyramid surface are retreated and the inclination of the expansion wave is made small so as to minimize influence on the group of pressure holes 53 on the forward pyramid surface. In the figures, reference numeral 52 denotes a total pressure tube, and 54 denotes a heater.

Figure 7A:
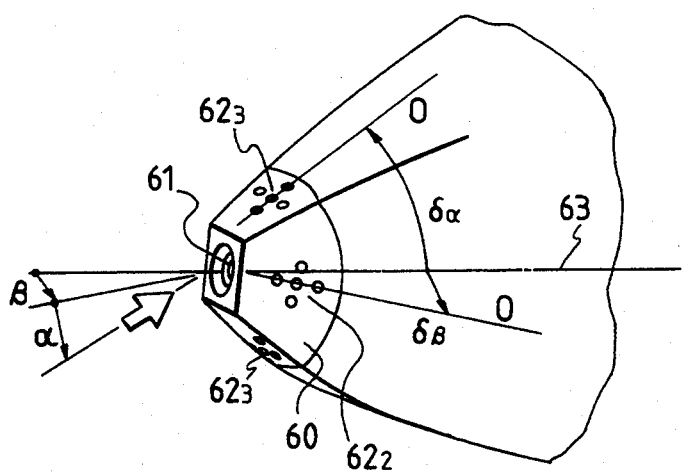
FIG. 7(a) is a side view showing an embodiment where the truncated pyramid-shape multi-hole Pitot probe of the present invention is made integral with the nose of an aircraft.
Figure 7B:
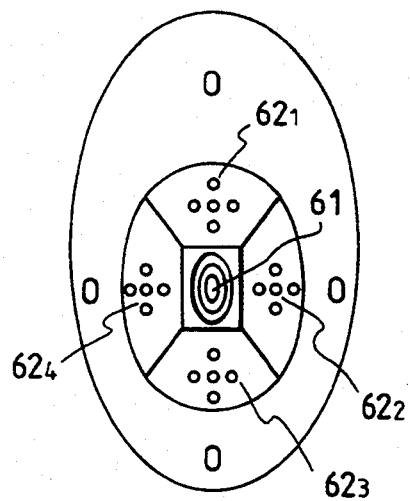
FIG. 7(b) is a front view thereof.

The square truncated pyramid-shape Pitot probe according to the present invention can be also applied to a nose of an aircraft including a spacecraft, an embodiment of which is shown in FIG. 7.

In the figures, reference numeral 60 denotes a nose of an aircraft. The nose constitutes a square truncated pyramid-shape Pitot probe, the nose being integral with the square truncated pyramid-shape Pitot probe. Its apex is formed with a shield type total pressure tube 61, and each pyramid surface is formed with a plurality (five in the present embodiment) of groups of pressure holes $62_1$, $62_2$, $62_3$ and $62_4$. In that embodiment, the square truncated pyramid-shape Pitot probe has a rectangular (i.e., not square) truncated pyramid shape, in which as shown, an angle of a pyramid surface with respect to a probe axis 63 is different in vertical side from lateral side. When an angle of a pyramid surface with respect to a probe axis is different in vertical side from lateral side as described, a differential detected by pressure holes in the pyramid surfaces is in a relation such that when an angle with respect to the probe axis is small (shallow), and a large differential is obtained, whereas when the angle is large, a differential is small. An ideal angle of a pyramid surface with respect to a probe axis is generally about 45° in consideration of a pressure resolution, a measuring range and the like.

Generally, with an aircraft except one such as a helicopter which is capable of hovering and side-slip, the attack angle $\alpha$ in the flight attitude angles is from about $-5°$ to about 40° and the sidestep angle $\beta$ is about $\pm 15°$ at maximum.

The rectangular truncated pyramid-shape probe becomes an integral configuration and improves its external appearance if it is applied to an oval-shape nose whose body is vertically elongated in section. On the other hand, in the truncated pyramid-shape multi-hole Pitot probe according to the present invention, since upper and lower holes are utilized at the time of takeoff and landing, it is necessary to have a large angle of a pyramid surface. During cruising, it is important to detect sideslip. It is therefore necessary that an angle with respect to up and down be made relatively small to increase the resolution and enhance the function of measuring the air velocity vector. In this connection, the rectangular probe advantageously fulfills the aforementioned requirements.

While in the above embodiments, a description has been made of the case where the present invention is applied to a velocity vector calculation system of a real plane, it is to be noted that the present invention is not at all restricted to the system loaded on the real plane but it can also be applied to experiments by a model flight within a wind tunnel. Furthermore, in the present invention, a truncated pyramid-shape multi-hole Pitot probe is provided at the rear of a model within a wind tunnel, or at the rear of the main wing of an experimental plane or at the tail wing, whereby it can be also applied to arithmetic processing of wake traverse.

What is claimed is:

1. In a truncated pyramid-shape multi-hole Pitot probe in which an extreme end portion has a truncated pyramid-shape, a cylindrical hole defined by cylindrical walls extending a predetermined depth into the probe, is provided at an apex thereof, a total pressure tube of a diameter smaller than that of the hole is fixed at a position by a predetermined length determined by a relationship with the diameter of the cylindrical hole from the extreme end of said cylindrical hole, and more than one pressure hole is arranged in each of the truncated pyramid surfaces of said truncated pyramid shape, the improvement comprising:

a plurality of said pressure holes arranged in a group in close proximity to each other near the center of each of said truncated pyramid surfaces for calculating a velocity vector from the respective pressures detected from said cylindrical hole and said plurality of pressure holes arranged on each of said truncated pyramid surfaces, wherein said pyramid surfaces are inclined at an angle with respect to an axis of said cylindrical hole which is in a range of 30° to 50°.

2. A truncated pyramid-shape multi-hole Pitot probe according to claim 1, wherein the number of pressure holes formed in each pyramid surface is five.

3. A truncated pyramid-shape multi-hole Pitot probe according to claim 1, wherein the edge of each pyramid surface furthest from the apex of the end portion of the probe is rounded.

4. A truncated pyramid-shape multi-hole Pitot probe according to claim 1, 2 or 3, wherein said probe comprises a rectangular truncated pyramid-shape Pitot probe in which the angle of upper and lower pyramid surfaces with respect to the probe axis is relatively larger than the angle of left and right pyramid surfaces.

5. A flight velocity detection system using a truncated pyramid-shape multi-hole Pitot probe, said system comprising:

a truncated pyramid-shape multi-hole Pitot probe in which an extreme end portion has a truncated pyramid-shape, including a cylindrical hole defined by cylindrical walls extending a predetermined depth into the probe provided at an apex thereof, a total pressure tube of a smaller diameter than that of a hole of said cylindrical hole fixed at a position by a predetermined length determined by a relationship with the diameter of the cylindrical hole from the extreme end of said cylindrical hole, and more than one pressure hole arranged near the center of each of the truncated pyramid surfaces of said truncated pyramid shape, wherein said pyramid surfaces are inclined at an angle with respect to an axis of said cylindrical hole which is in a range of 30° to 50°; and a velocity vector process for calculating flight velocity vector (V, $\alpha$, $\beta$) with respect to a probe axis from: (1) pressure information obtained by inputting a total pressure value and pressure values from each of the pyramid surfaces detected by said truncated pyramid-shape multi-hole Pitot probe and converting them into electric signals; (2) pressure coefficients of the pressure holes of said probe with respect to the velocity vector which are stored in advance in a memory; and (3) a value for air density which is stored in advance in said memory.

6. A flight velocity detection system according to claim 5, wherein a dynamic pressure value is calculated from the total pressure value and the pressure value from each pyramid surface detected by the truncated pyramid-shape Pitot probe, a static pressure value is calculated from the total pressure and the said dynamic pressure value, and an altitude and a ratio of altitude are calculated using said static pressure value.

7. A flight velocity detection system according to claim 5 or 6, wherein an output of an attitude azimuth reference device is input into the velocity vector processor and information from the attitude azimuth reference device is connected with information from the flight velocity vector with respect to an airframe axis wherein said velocity vector processor calculates the air flight velocity vector.

8. A flight velocity detection system according to claim 5, wherein each pyramid surface of the truncated pyramid-shape multi-hole Pitot probe has a plurality of pressure holes.

9. A flight velocity detection system according to claim 5, wherein the truncated pyramid-shape multi-hole Pitot probe comprises a square truncated pyramid-shape Pitot probe.

10. A flight velocity detection system according to claim 5, wherein the edge of each pyramid surface furthest from the apex of the end of the truncated pyramid-shape multi-hole Pitot probe is rounded.

11. A flight velocity detection system according to claim 5, wherein the truncated pyramid-shape multi-hole Pitot probe is integral with a nose of an aircraft.

* * * * *